H. NORMAN.
MOWER.
APPLICATION FILED APR. 24, 1908.
922,319.
Patented May 18, 1909.
3 SHEETS—SHEET 2.
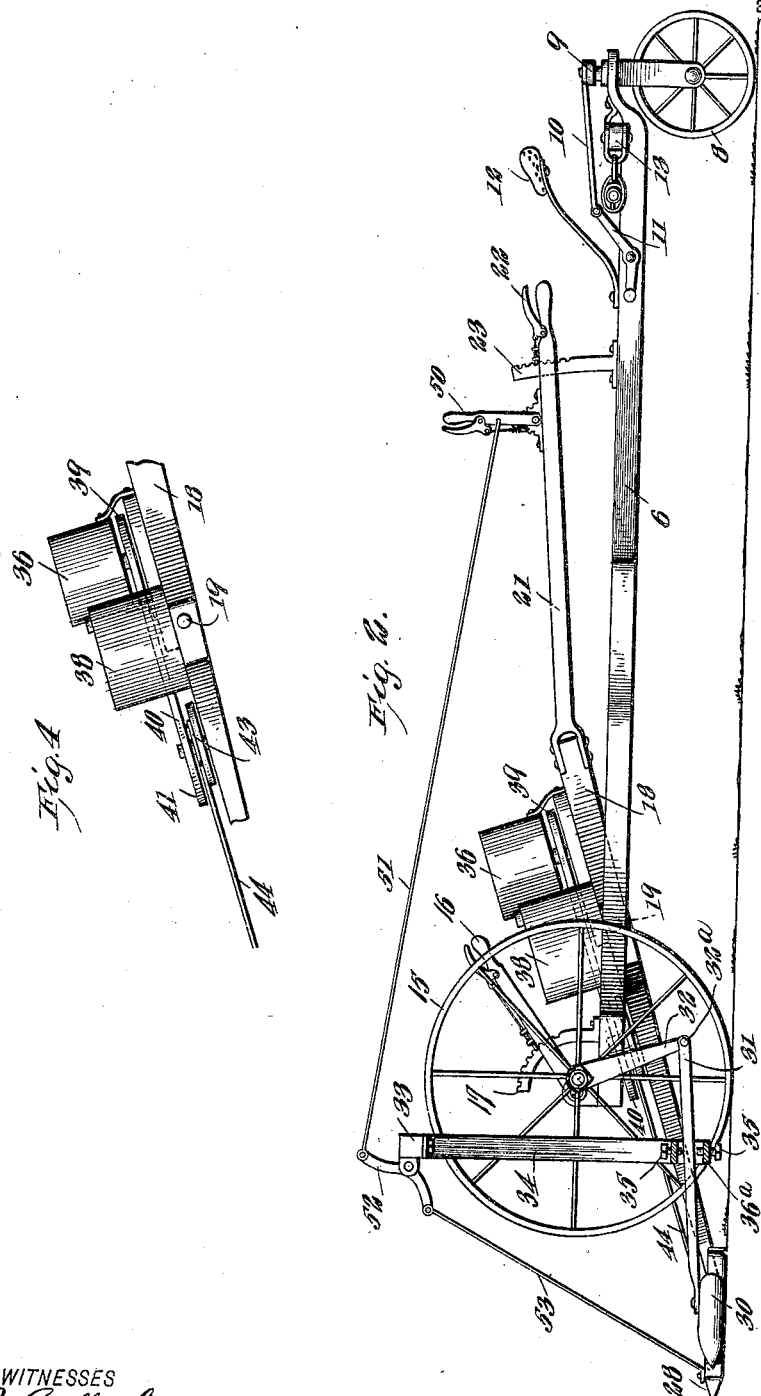
WITNESSES
INVENTOR
HOWARD NORMAN
BY 
ATTORNEYS H. NORMAN.
MOWER.
APPLICATION FILED APR. 24, 1908.
922,319.
Patented May 18, 1909.
3 SHEETS—SHEET 3.
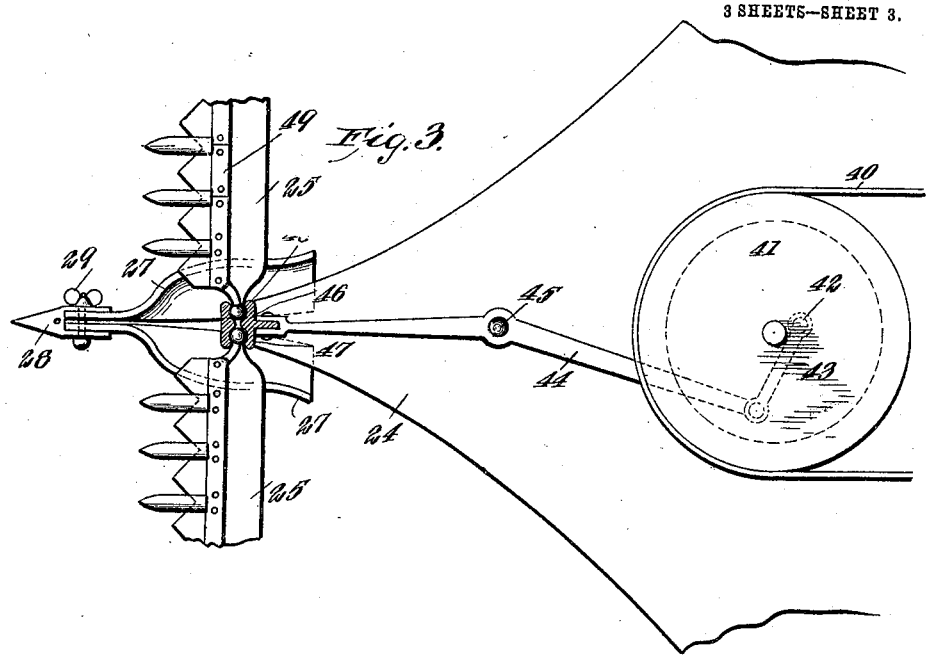
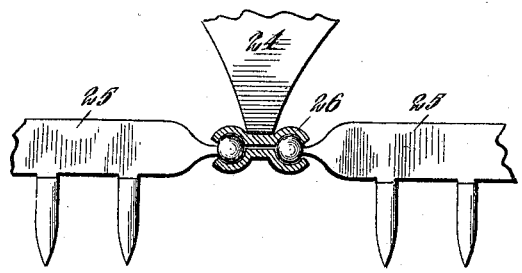
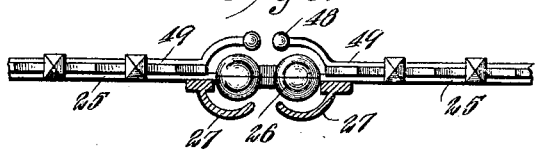
WITNESSES
E. M. Callaghan
F. C. Barry
INVENTOR
HOWARD NORMAN
BY Munn & Co.
ATTORNEYS

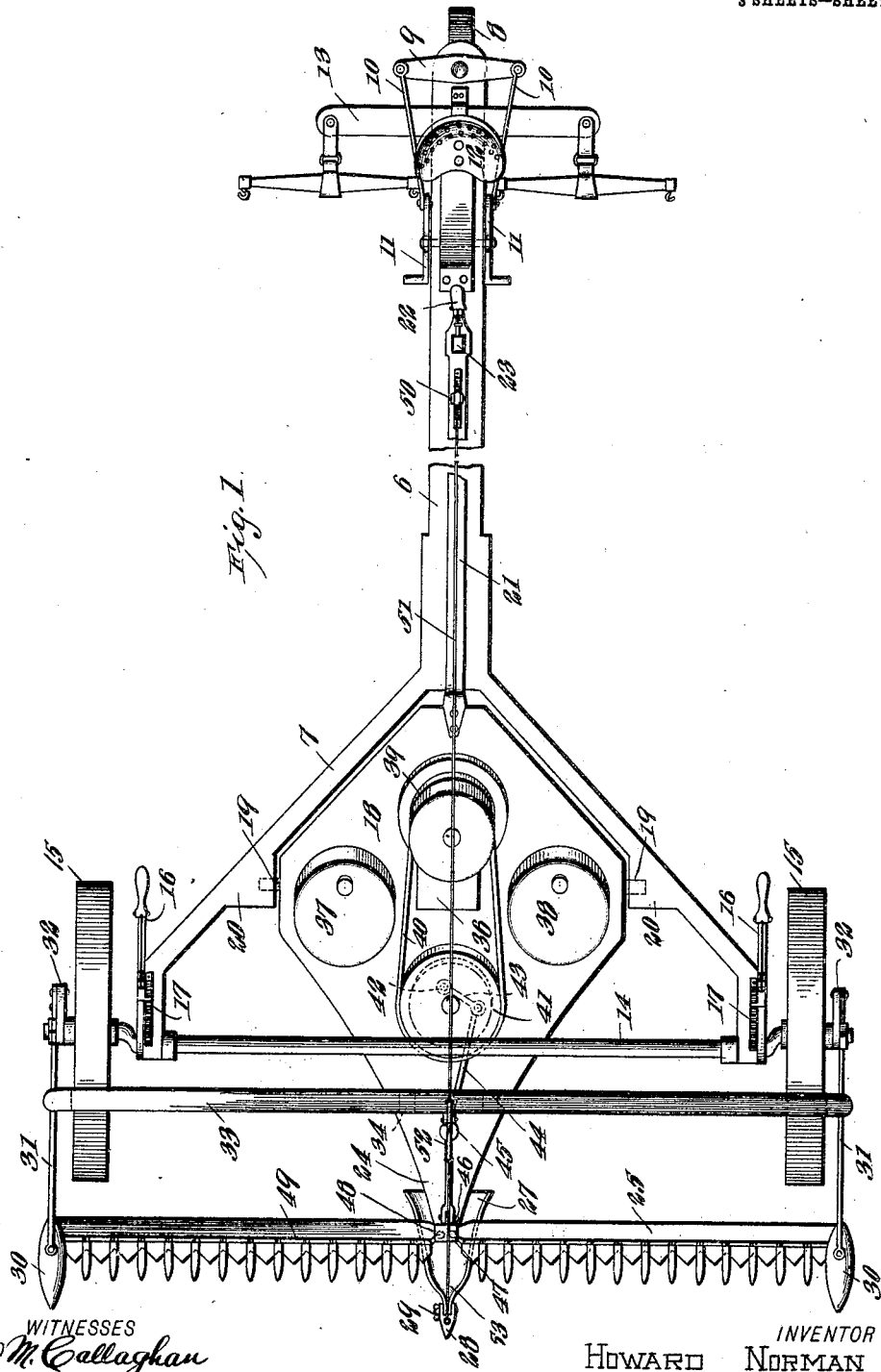

UNITED STATES PATENT OFFICE.

HOWARD NORMAN, OF FOWLER, KANSAS.

MOWER.

No. 922,319.   Specification of Letters Patent.   Patented May 18, 1909.

Application filed April 24, 1908. Serial No. 428,899.

*To all whom it may concern:*

Be it known that I, HOWARD NORMAN, a citizen of the United States, and a resident of Fowler, in the county of Meade and State of Kansas, have made certain new and useful Improvements in Mowers, of which the following is a specification.

This invention relates to mowers wherein the cutter bars are carried ahead of the team, and has a main frame mounted on wheels and driven by horse power, and on this is mounted a rocking platform or frame which carries an engine such as a small gasolene engine, with a pair of cutter bars in front and driving devices or gearing at the middle line of the machine, between the inner adjacent ends of the cutter bars and the engine, whereby the engine drives the cutters.

The cutter bar frame is so supported that it will flex at the middle, that is, at the joint between the finger bars and the nose or point of the frame, and the frame is also mounted on pivots transversely, whereby the cutting gear may be raised out of action, and the cutting devices are free to follow the inequalities of the ground.

The construction will be more fully apparent from the following description and the accompanying drawings, in which—

Figure 1 is a plan of the machine. Fig. 2 is a side elevation. Fig. 3 is a detail in plan, showing the driving connections to the cutter bars. Fig. 4 is a detail in side elevation of the tilting platform which supports the engine. Fig. 5 is a horizontal sectional detail of the ball and socket connections between the point of the tilting frame and the finger bars. Fig. 6 is a vertical sectional detail showing the same, and also the shoes and cutter bars.

The frame of the machine comprises a longitudinal middle beam 6 at the front end of which are diverging arms 7 forming a yoke. The rear end is mounted on a caster wheel 8 with a T head 9 connected by rods 10 to treadle levers 11, by which the machine is steered, the driver's seat 12 being mounted on the beam, as well as the double-tree 13 to which the draft animals are hitched, one on each side of the beam. The front ends of the arms 7 are mounted on the crank axle 14 carried on wheels 15. Levers 16 are secured to the axle and have latches engaging notched segments 17 on the arms, whereby the front end of the frame may be raised or lowered.

A tilting platform 18 is pivotally mounted by trunnions 19 on bosses 20 on the inner sides of the arms 7, and is shaped to fit and swing between the arms of the yoke. Its angle or tilt is varied by means of a rearwardly extending lever 21 having a latch 22 engaging a notched segment 23 projecting upwardly from the beam 6 through a slot in the lever.

The front end of the platform tapers to a nose or point 24 at the median line and this articulates with the inner ends of a pair of laterally extending finger bars 25 by means of ball and socket joints 26, the sockets being formed by castings rigid with the point of the platform, and the finger bars having balls at the end. A pair of concave shoes 27 are fixed to the ends of the finger bars at one edge and curve under the joints, being spaced at the inner edges to allow the respective finger bars to vibrate in a vertical plane to follow uneven ground. The fronts of the shoes taper to round ends which are set in a pointed ferrule 28, one end being fixed to the ferrule by a set screw 29 and the other end being free to turn in the ferrule. At their outer ends the finger bars have dividing shoes 30. In order to maintain the finger bars in perpendicular alinement with the longitudinal axis of the machine, the shoes 30 are connected to the front ends of bars 31, the rear ends of which are pivotally connected to the lower ends of crank arms 32, depending from and rigid with the outer ends of the axle 14. To hang or carry the outer ends of the finger bars on the tilting platform 18, a cross bar 33 is provided, supported at the middle by posts 34 standing on the platform near the front end thereof. At each end this bar has a pair of depending bars 34, between which the bars 31 pass or are located and are confined vertically between set screws 35 in cross pieces 36ª; and the set screws limit the vertical vibration of the bars 31 and consequently of the outer shoes on the finger bars, the whole forming hangers for the finger bars by means of which they are swung up or down with the tilting platform. A gasolene engine 36 is mounted on said platform, as well as a water tank 37 and gasolene tank 38 and the engine has a vertical shaft with a pulley 39 connected by belt 40 to a pulley 41 having a wrist pin 42 connected by link 43 with the rear end of a bent lever 44 fulcrumed at 45 on the platform. The front end of this lever is bolted to a casting 46 having a pair of sockets 47 on opposite sides, which receive balls 48 at the inner ends of the cutter bars 49, which reciprocate on the finger bars in the usual way.

The tilt of the finger bars and closeness of cut is controlled by a hand lever 50, fulcrumed on the rear end of the lever 21 and connected by rod 51 to a bent lever 52 fulcrumed on cross bar 33, connected by rod 53 to the ferrule 28.

In operation, the machine is drawn by the team in an obvious manner, cutting in front as the machine advances. The engine drives the cutter bars by means of the transmission devices described and illustrated. The ball and socket joints allow vertical vibration incident to uneven ground.

To lift the cutters temporarily out of action, the lever 21 is depressed and latched down. This swings the platform on its trunnions 19 and holds the finger bars free from the ground, the ends being supported by the cross bar 33 and hangers depending therefrom, which lift the bars 31 and outside shoes.

When it is desired to travel across country, and additional elevation of the bars is required, the cranked axles are swung down by the levers 16, raising the front end of the whole main frame. At the same time, the crank arms 32, being rigid with the axles, are thereby swung forward and the hanger bars 34 having already lifted the brace bars 31 above the crank pins 32ª, the forward swing of the cranks causes the bars 31 to be tipped up on the fulcrum formed by the limit bolts 35, thus raising the outer ends of the finger bars much higher than the inner ends thereof.

I claim—

1. In a mowing machine, the combination of a wheeled frame having spaced arms at the front, a tilting platform pivotally mounted between the arms, cutting devices extending oppositely from the middle of the platform at the front thereof, and means carried by the platform to operate said devices.

2. In a mowing machine, the combination of a frame having a median longitudinal beam with diverging arms at the front end, and a caster wheel and draft devices at the rear end, a crank axle extending across at the front ends of the arms and provided with wheels supporting the same, levers to turn the axle, and cutting devices carried at one end of the frame and extending across the same.

3. In a mowing machine, the combination of a wheeled frame, a tilting platform at the front end thereof, a pair of cutting mechanisms flexibly connected at their inner ends to the front end of the platform at the middle thereof and extending laterally in front of the frame, hangers supported on the platform and connected to the outer ends of the mechanisms, and means carried by the platform to operate said mechanisms.

4. In a mowing machine, the combination of a wheeled frame, a tilting platform at the front end thereof, tapered forwardly to a point at the middle line, finger bars flexibly joined to the point of the platform and extending laterally in opposite directions therefrom, reciprocating cutter bars on the finger bars, and means carried by the platform and flexibly joined to the cutter bars to operate the same.

5. In a mowing machine, the combination of a wheeled frame, a tilting platform at the front end thereof, a pair of finger bars extending across the front of the machine and having ball and socket joints with the platform, reciprocating cutter bars on the finger bars, and means carried by the platform to operate the cutter bars, including a laterally vibrating lever having ball and socket joints with the ends of the cutter bars.

6. The combination of a vertically tilting platform and means to carry the same, the platform having a point at the middle, of a pair of finger bars jointed to the point of the platform and extending laterally on opposite sides thereof, shoes under the inner ends of the finger bars, reciprocating cutter bars, means carried on the platform to operate the same, and means mounted on the platform to support the outer ends of the finger bars.

7. The combination of a vertically tilting platform and means to carry the same, a pair of cutting mechanisms including finger bars and cutter bars flexibly connected at their inner ends to the middle of the platform, a cross bar supported on the platform, hangers depending at the outer ends of the bar, connections between the hangers and the outer ends of the finger bars, and means carried by the platform to operate the cutter bars.

8. The combination of a wheeled frame having an axle at the front provided with depending crank arms, a tilting platform on the front of the frame, a pair of cutting mechanisms including finger bars and cutter bars supported at their inner ends by the platform, bars connecting the outer ends of the finger bars and the crank arms, and hangers supported on the platform and loosely connected to the bars to support the outer ends of the finger bars.

9. The combination of a wheeled frame, a downwardly inclined platform at the front thereof, a pair of cutting mechanisms supported by the platform at the front thereof, including finger bars having universal joints with the platform and shoes under the same, and means to tilt up the finger bars, comprising an upper cross bar supported above the platform, a bent lever fulcrumed on the cross bar and connected to the shoes, and a hand lever at the rear of the platform, connected to the bent lever.

10. The combination of a wheeled frame having a cranked axle at the front provided with crank arms depending at the outer ends thereof, a tilting platform mounted on the frame and projecting downwardly and forwardly under the axle, a pair of cutting mechanisms articulated at their inner ends to the front end of the platform and having rearwardly extending bars at their outer ends connected to said crank arms, a cross bar mounted upon and above the platform and having hangers at its outer ends loosely connected to the said rearwardly extending bars, and means to operate said cutting mechanisms.

HOWARD NORMAN.

Witnesses:
   JOHN JOBLING,
   POWELL SEALOCK.